(12) United States Patent
Coon et al.

(10) Patent No.: US 8,695,315 B2
(45) Date of Patent: Apr. 15, 2014

(54) DRAPER HEADER WITH PIVOTING SIDE DRAPER CONVEYORS

(75) Inventors: Steve Coon, Moline, IL (US); Benjamin Lovett, Colona, IL (US); Shane Anderson, Syracuse, UT (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/570,944

(22) Filed: Aug. 9, 2012

(65) Prior Publication Data
US 2014/0041354 A1 Feb. 13, 2014

(51) Int. Cl.
*A01D 43/00* (2006.01)

(52) U.S. Cl.
USPC ............................................... 56/158; 56/202

(58) Field of Classification Search
USPC .................................... 56/158, 208, 181, 14.4
See application file for complete search history.

(56) References Cited

U.S. PATENT DOCUMENTS

| | | | | |
|---|---|---|---|---|
| 2,099,471 | A * | 11/1937 | Edgington | 56/312 |
| RE21,604 | E * | 10/1940 | Hume et al. | 56/158 |
| RE35,543 | E * | 7/1997 | Patterson | 56/14.4 |
| 6,675,568 | B2 * | 1/2004 | Patterson et al. | 56/208 |
| 7,191,582 | B2 * | 3/2007 | Bomleny | 56/10.2 E |
| 7,207,164 | B2 * | 4/2007 | Bomleny | 56/10.2 E |
| 7,222,475 | B2 * | 5/2007 | Bomleny et al. | 56/10.2 E |
| 7,430,846 | B2 * | 10/2008 | Bomleny et al. | 56/10.2 E |
| 8,051,633 | B2 * | 11/2011 | Figgins et al. | 56/181 |
| 8,230,670 | B2 * | 7/2012 | Schmidt et al. | 56/208 |
| 2008/0072560 | A1 * | 3/2008 | Talbot | 56/208 |
| 2008/0078155 | A1 * | 4/2008 | Coers et al. | 56/15.8 |
| 2009/0084080 | A1 * | 4/2009 | Coers et al. | 56/15.8 |
| 2009/0277144 | A1 * | 11/2009 | Honas et al. | 56/153 |
| 2010/0043372 | A1 * | 2/2010 | Honas et al. | 56/181 |
| 2010/0269472 | A1 * | 10/2010 | Coers et al. | 56/15.8 |

* cited by examiner

*Primary Examiner* — Arpád Fábián-Kovács (57) ABSTRACT

A draper header has a transverse main frame supporting center, left side and right side belt conveyors and including a plurality of transversely spaced knife support members that extend forwardly beneath the belt conveyors from right and left lower rear main frame members and have forward ends on which a transversely extending knife is supported. Each belt conveyor includes a frame disposed within an endless belt and having a rear side hinged to a respective lower rear main frame member for pivoting upwardly between operating and belt-changing positions. Brackets are removably fixed across the length of the knife and have rear edges extending above front edges of the belts when the conveyors are in their operating positions. At least one height adjuster is mounted between the main frame and each conveyor frame for moving each conveyor to its belt-changing position once the associated brackets are removed from the knife.

16 Claims, 7 Drawing Sheets

DRAPER HEADER WITH PIVOTING SIDE DRAPER CONVEYORS

FIELD

The invention relates to draper headers. More particularly it relates to side draper conveyors. Even more particularly it relates to pivoting side conveyors.

BACKGROUND

Draper headers employ endless belt conveyors to convey crop from a reciprocating knife or cutter bar to the combine harvester vehicle that supports the draper header and carries the draper header through the agricultural field. Once in the combine harvester vehicle, the crop is threshed, separated, and cleaned.

Draper headers have endless belt conveyors that carry the crop laterally (the left and right side conveyors) to a center portion of the draper, and a center conveyor that receives the crop from these side conveyors and transmits it to rearward and to the combine harvester.

The endless belts for the draper header periodically wear out. When they wear out they must be replaced. The typical method of replacing the endless belts is to break them longitudinally at a splice and work them out of the machine, around rollers and through narrow spaces. This process is time consuming. It has been proposed, therefore to leave the belt intact in the form of an endless loop, to disconnect the forward ends of the rollers and to slide the endless belts of the left and right side conveyors off the rollers that support the endless belt.

Given the size and weight of the left and right side conveyors, this process can be difficult if not impossible for a single person, or even for a pair of people to do. It would therefore be beneficial to provide draper conveyors with mechanical assistance capable of lifting and/or holding the rollers to/in an elevated position as the belts are removed. It is an object of this invention to provide such an arrangement.

SUMMARY

In accordance with a first aspect of the invention, a draper header is provided comprising: a main draper frame having left and right sides; a left side draper conveyor pivotally coupled to the left side of the main draper frame; a right side draper conveyor pivotally coupled to the right side of the main draper frame; wherein the left and right side draper conveyors are comprised of, a side draper conveyor frame, at least one hinge coupling the side draper conveyor frame to the main draper frame, wherein each side draper conveyor frame includes a generally planar framework, a first roller supported on an inner end of the side draper conveyor framework, a second roller supported on an outer end of the side draper conveyor framework, an endless belt extending about and supported on the first and second rollers, the endless belt having an upper surface disposed to receive crop severed from the ground and to transport it laterally toward a central portion of the main draper frame, the endless belt further defining a forward edge disposed to move in a recirculating path adjacent to the reciprocating knife, and further defining a rear edge disposed to move in a recirculating path adjacent to the at least one hinge, and at least one height adjuster that has an adjustable working length and is disposed to pivot the side draper conveyor frame upward about an axis of rotation defined by the at least one hinge when the working length of the at least one height adjuster is changed.

The height adjuster may be a threaded fastener. The height adjuster may be disposed below the at least one hinge. The at least one hinge may constrain the side draper conveyor frame to pivot with respect to the main draper frame about a first axis that extends parallel to a lateral extent of the draper header. The threaded fastener may abut the side draper frame at a point below the first axis. The side draper conveyor framework may comprise an elongate front member disposed adjacent to a forward edge of the endless belt and an elongate rear member that is disposed adjacent to a rear edge of the belt. The elongate front member and elongate rear member may be generally parallel. The draper header may further comprise at least one bracket removably fixed to the reciprocating knife and defining a rear edge that extends over the forward edge of the endless belt. The at least one bracket may be disposed above the left side draper conveyor and the right side draper conveyor such that the endless belts of the conveyors cannot be slidably removed from the left side draper conveyor frame and the right side draper conveyor frame until the at least one bracket is removed. The at least one bracket may be a crop ramp that is disposed to carry crop from the reciprocating knife over the forward edge of the endless belts.

In accordance with a second aspect of the invention, a side draper conveyor for a draper header having a left side and a right side, a laterally extending main frame, and a reciprocating knife fixed to and extending forward from a forward edge of the main frame, may be provided, the side draper conveyor comprising: a side draper conveyor frame, at least one hinge configured to couple the side draper conveyor frame to the main draper frame, the side draper conveyor frame including a generally planar framework, a first roller supported on an inner end of the side draper conveyor framework, a second roller supported on an outer end of the side draper conveyor framework, an endless belt extending about and supported on the first and second rollers, the endless belt having an upper surface disposed to receive crop severed from the ground and to transport it laterally toward a central portion of the main draper frame, the endless belt further defining a forward edge disposed to move in a recirculating path adjacent to the reciprocating knife, and further defining a rear edge disposed to move in a recirculating path adjacent to the at least one hinge, and at least one height adjuster that has an adjustable working length and is disposed to pivot the side draper conveyor frame upward about an axis of rotation defined by the at least one hinge when the working length of the at least one height adjuster is changed.

DETAILED DESCRIPTION

In the description below, the terms "forward", "front" "in front of" and the like refer to the direction of travel of the header when it is traveling through the field in a straight line harvesting crop. This direction is identified in the figures by arrow "V". The terms "backward", "rearward", "to the rear", "behind" and similar terms refer to a direction opposite to the forward direction.

Figure 1:
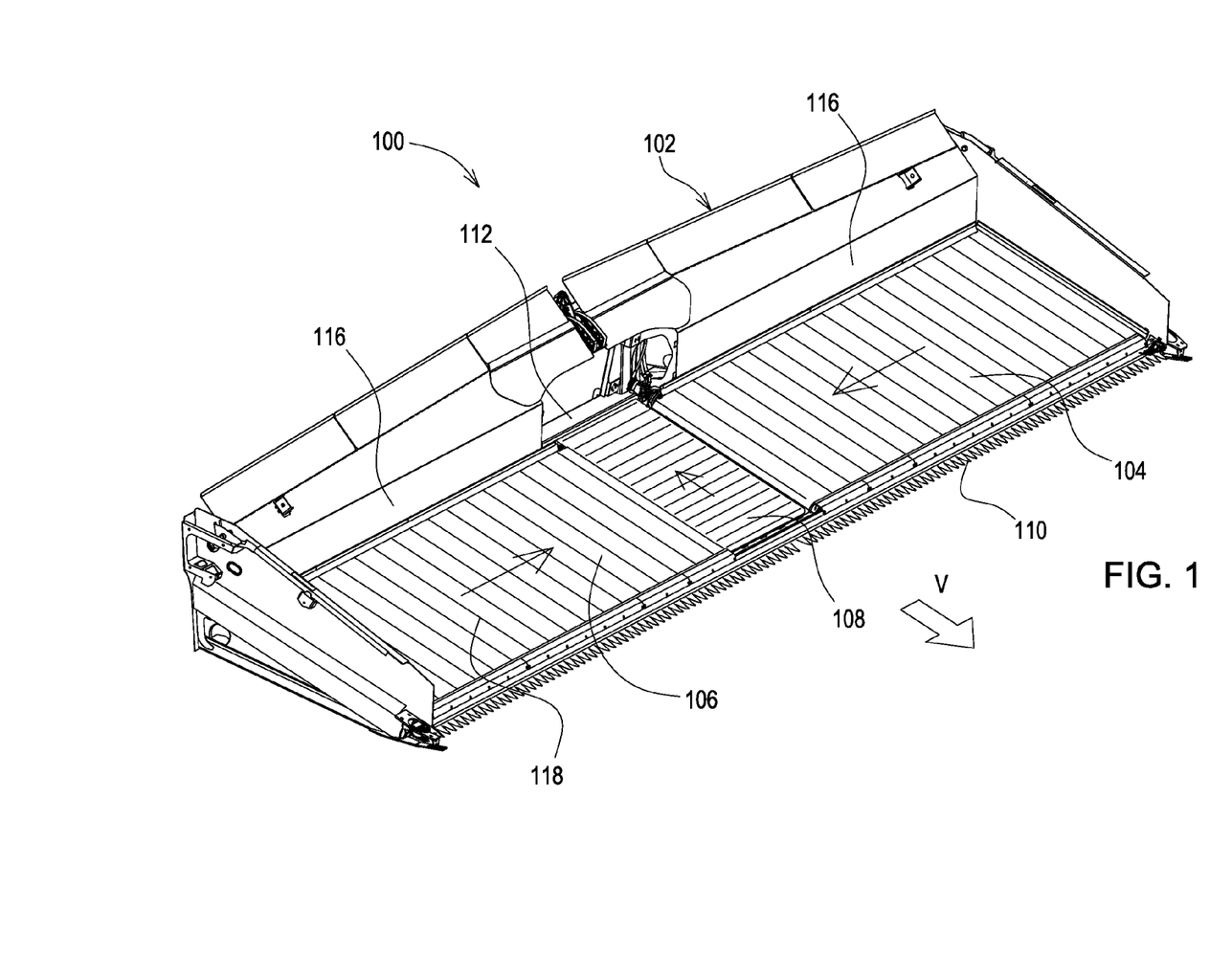
FIG. 1 is a right side perspective view of a draper header in accordance with the present invention.

In FIG. 1, draper header 100 comprises a main draper frame 102, a left side draper conveyor 104, a right side draper conveyor 106, a central conveyor 108 and a reciprocating knife 110.

The main draper frame 102 supports the left side draper conveyor 104, the right side draper conveyor 106, the central conveyor 108 and the reciprocating knife 110. As can best be seen in FIG. 4, a lower rear main frame member 112 and an upper rear frame member 113 of the main draper frame 102 are interconnected by a plurality of laterally spaced upright frame members 115 and are configured to be supported on a feederhouse of a combine harvester (not shown) in a conventional manner. In this way, the draper header 100 is carried through an agricultural field in a direction "V" that is perpendicular to the longitudinal extent of the draper header 100 and parallel to the ground.

The left side draper conveyor 104 and right side draper conveyor 106 extend perpendicular to the direction of travel, and convey crop in a direction perpendicular to the direction of travel of the draper header 100 as indicated by the arrows superimposed on the conveyors.

The central conveyor 108 extends generally parallel to the direction of travel. The endless belt that comprises the central conveyor 108 travels rearward in a direction indicated by the arrow superimposed on the conveyor. The central conveyor 108 receives crop material falling off the inner ends of the left side draper conveyor 104 and the right side draper conveyor 106. Material falling onto the central conveyor 108 is carried rearward through an aperture in the main draper frame 102. This material is carried rearward into the feederhouse (not shown) and into the combine harvester (not shown) for further processing.

The reciprocating knife 110 is supported on the main draper frame and extends laterally across substantially the entire width of the main draper frame 102. The reciprocating knife 110 is disposed close to the ground in order to sever crop plants at their roots, and permit the upper portion of the severed plants to fall onto the left side draper conveyor 104, the right side draper conveyor 106, and the central conveyor 108.

Figure 2:
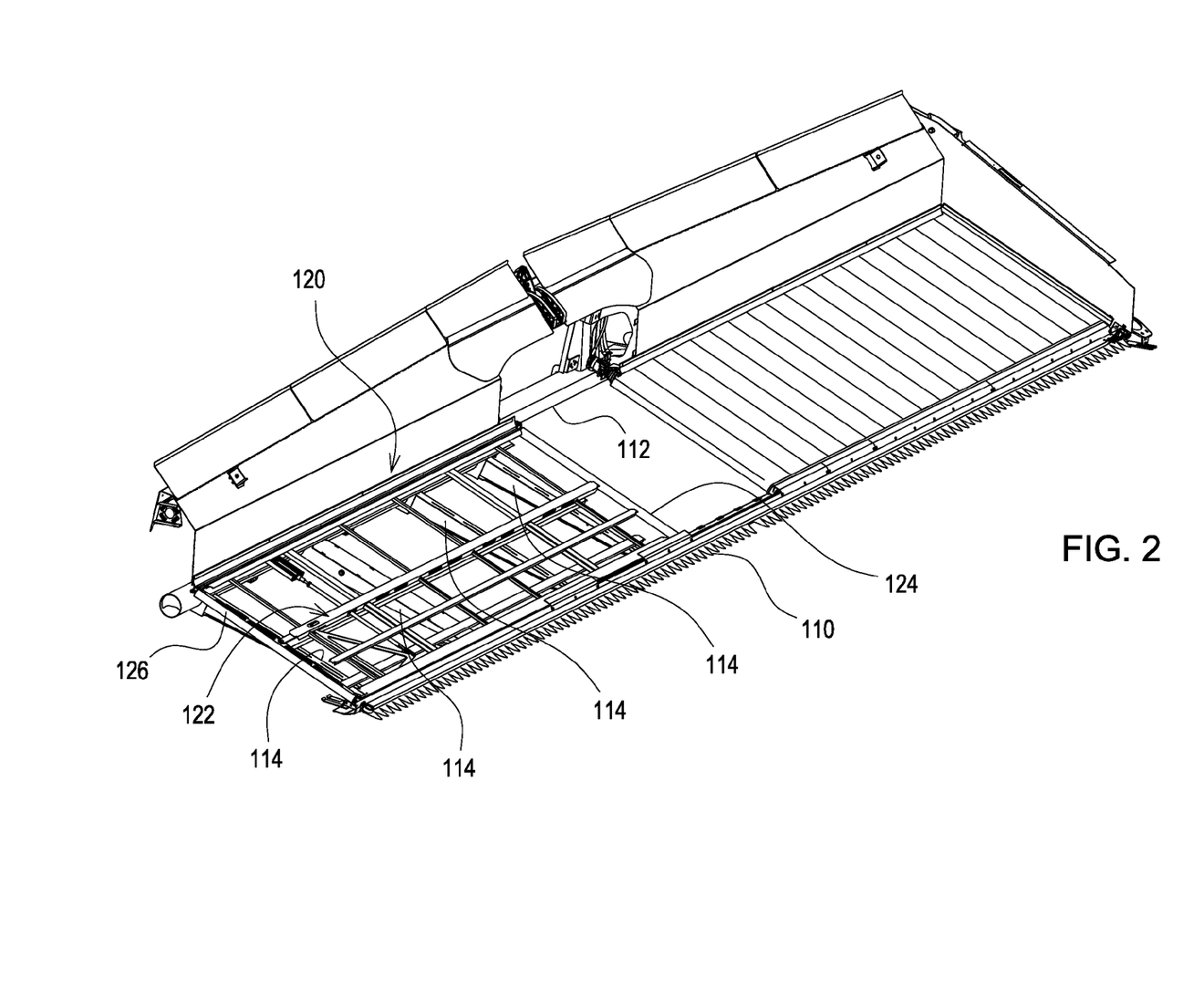
FIG. 2 is a fragmentary right side perspective view of the draper header of FIG. 1 with the right end of the draper header removed and the endless belt of the right side draper conveyor removed.

FIG. 2 illustrates the draper header 100 of FIG. 1 in which the crop divider at the right end of the draper header 100 is removed and the endless belt that forms the moving surface of right side draper conveyor 106 is also removed.

The left side draper conveyor 104 and the right side draper conveyor 106 are identically constructed but in mirror image relationship about a plane that extends vertically and fore and aft through the lateral midpoint of the draper header 100.

Main draper frame 102 comprises the lower rear a main frame member 112, the upper rear main frame member 113, the upright members 115, knife supports 114, and back sheets 116.

Main frame member 112 is generally tubular and extends laterally across the bottom rear of the draper header 100. A plurality of knife supports 114 are fixed to the main frame member 112 and extend forward therefrom. They are spaced apart across the width of the draper header 100. At their forward ends they are fixed to reciprocating knife 110. Knife supports 114 hold reciprocating knife 110 in a fixed position forward of the main frame member 112. Knife supports 114 hold reciprocating knife 110 parallel to and generally forward of main frame member 112.

The right side draper conveyor 106 comprises an endless belt 118 (FIG. 1) and a side draper conveyor frame 120. Endless belt 118 is removed in FIG. 2 to more easily view side draper conveyor frame 120.

Endless belt 118 is typically comprised of a fabric belt embedded in an elastomeric compound.

Figure 3:
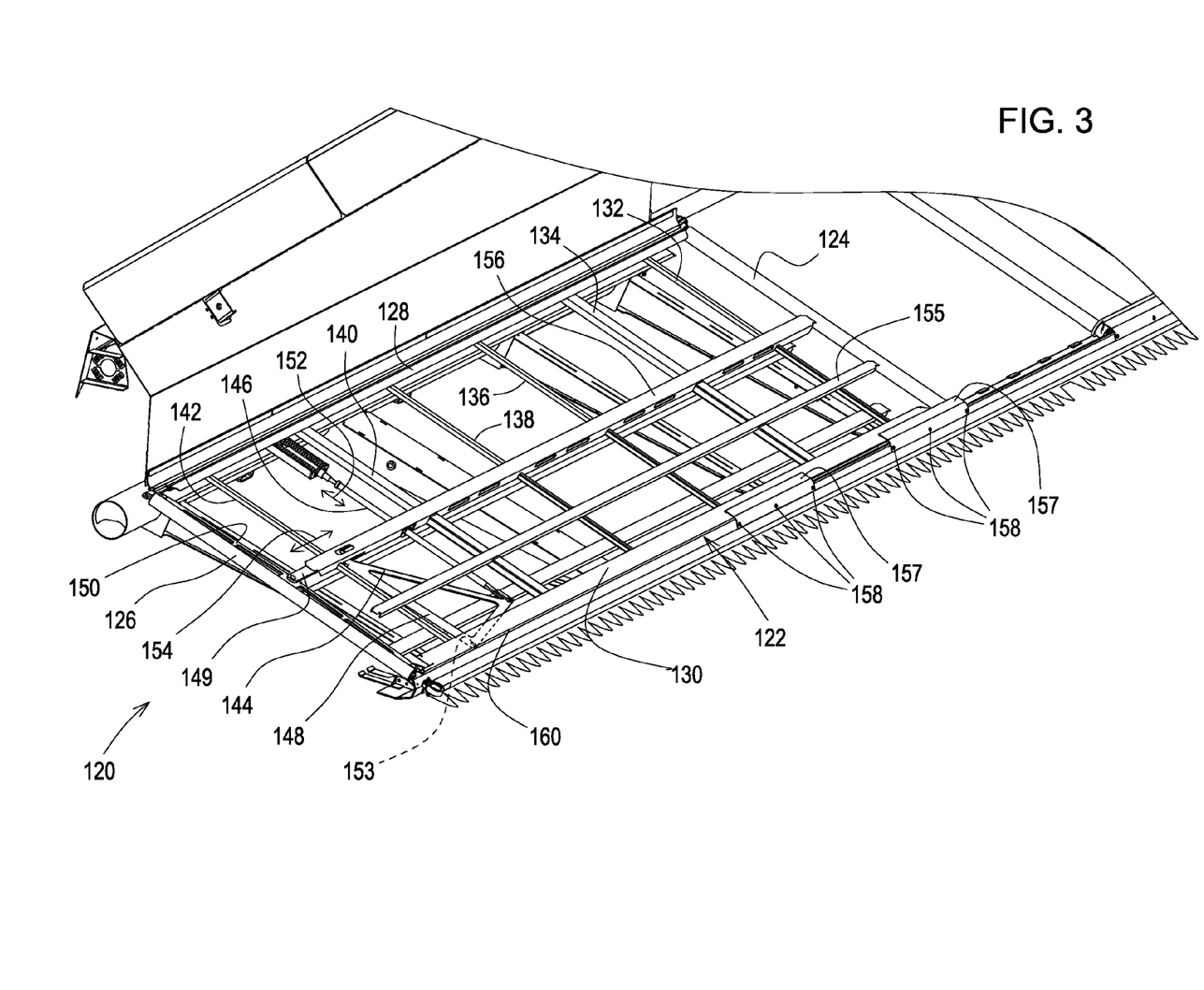
FIG. 3 is a detail view of the right side draper conveyor shown in FIG. 2.

Referring to FIGS. 2 and 3, side draper frame 120 comprises a generally planar framework 122, a first roller 124 and a second roller 126. Generally planar framework 122, first roller 124, and second roller 126 are coupled together to form a generally rectangular planar structure about which endless belt 118 is wrapped. First roller 124 is driven in rotation by a motor (not shown). Second roller 126 is an idler roller. The motor (not shown) that drives the first roller and the second roller causes the planar top surface of endless belt 118 to move in a direction indicated by the arrow superimposed on endless belt 118 in FIG. 1.

First roller 124 and second roller 126 are supported on generally planar framework 122 such that their longitudinal and rotational axes are parallel, with first roller 124 located at the innermost end of generally planar framework 122, and second roller 126 located at the outermost end of generally planar framework 122.

Referring now to FIG. 3, generally planar framework 122 includes a rear frame member 128, front frame member 130, connecting members 132, 134, 136, 138, 140, 142, and tensioning mechanism 144.

Rear frame member 128 extends parallel to the main frame member 112 and is hingeably coupled to the main frame member 112. Rear frame member 128 is an elongate member that is supported on hinges to pivot with respect to main frame member 112 about an axis that extends generally parallel to the longitudinal extent of the main frame member 112 and the longitudinal extent of the rear frame member 128. Connecting members 132, 134, 136, 138, 140, 142 extend generally fore-and-aft and are fixed at their rear ends to rear frame member 128. Connecting members 132, 134, 136, 138, 140, 142 are fixed at their forward ends to front frame member 130. Front frame member 130 extends generally parallel to rear frame member 128.

First roller 124 is supported on the inner ends of rear frame member 128 and front frame member 130 for rotation about a central longitudinal axis of first roller 124. Second roller 126 is supported on the outer ends of the rear frame member 128 and front frame member 130 to slide laterally inwardly and outwardly with respect to the outer ends of the frame members 128, 130, and to rotate about a central longitudinal axis of second roller 126.

Tensioning mechanism 144 comprises an adjustment member 146, a belt crank 148, a connecting link 149, and a tensioning arm 150. Adjustment member 146 extends through a hole in the back wall of draper header 100 such that it can be rotated by the operator to increase or decrease the tension in endless belt 118. As adjustment member 146 is rotated, it moves in the direction indicated by arrow 152. This movement causes bell crank 148 to pivot about bell crank mount 153. This pivoting movement of bell crank 148, in turn, causes tensioning arm 150 to move laterally with respect to the other components of generally planar framework 122. This lateral movement of tensioning arm 150, causes second roller 126, which is supported for rotation on tensioning arm 150 to move laterally inwardly and outwardly (depending on the direction of movement of tensioning arm 150 and indicated by arrow 154). This inward and outward lateral movement, in turn, increases and decreases, respectively, the distance between first roller 124 and second roller 126. Thus, when the operator manipulates the adjustment member 146 he can selectively increase or decrease the tension in endless belt 118, including decreasing the tension sufficient to permit endless belt 118 to go completely slack, and therefore to be slidingly removed from side draper conveyor frame 120.

Two elongate belt supports 155, 156 are supported on and above the upper surfaces of connecting members 132, 134, 136, 138, 140, 142 to provide a smooth, and relatively low friction surface that is capable of supporting the bottom surface of the upper run of endless belt 118 for sliding relative movement as endless belt 118 is driven in recirculating movement about the first and second rollers 124, 126.

The side draper conveyor frame 120 is supported on hinges to pivot up and down with respect to main frame member 112. This pivoting movement is prevented during normal operation by fixing front frame member 130 to the reciprocating knife 110. Specifically, brackets 157 are fixed to the reciprocating knife 110 and extend rearward therefrom, partially overlapping the endless belt 118. The brackets 157 are fixed to stationary portions of reciprocating knife 110 by threaded fasteners 158. In FIG. 3, two of these brackets 157 are shown, each being fixed to reciprocating knife 110 with three threaded fasteners 158. Four more of these brackets are provided to secure substantially the entire length of front frame member 130 to the reciprocating knife 110. These additional four brackets being removed for convenience of illustration. The brackets 157 cover a gap 160 that is provided between front frame member 130 and reciprocating knife 110. The brackets 157 function as a crop ramp to carry crop from the reciprocating knife over the gap 160, and onto the surface of the endless belt. If all six of brackets 157 were illustrated in FIG. 3, brackets 157 would extend across the forward edge of front frame member 130, would cover substantially the entire forward edge of the endless belt, and would substantially prevent crop from falling into the gap 160 or being inserted into the space between the forward edge of the endless belt and front frame member 130.

Figure 4:
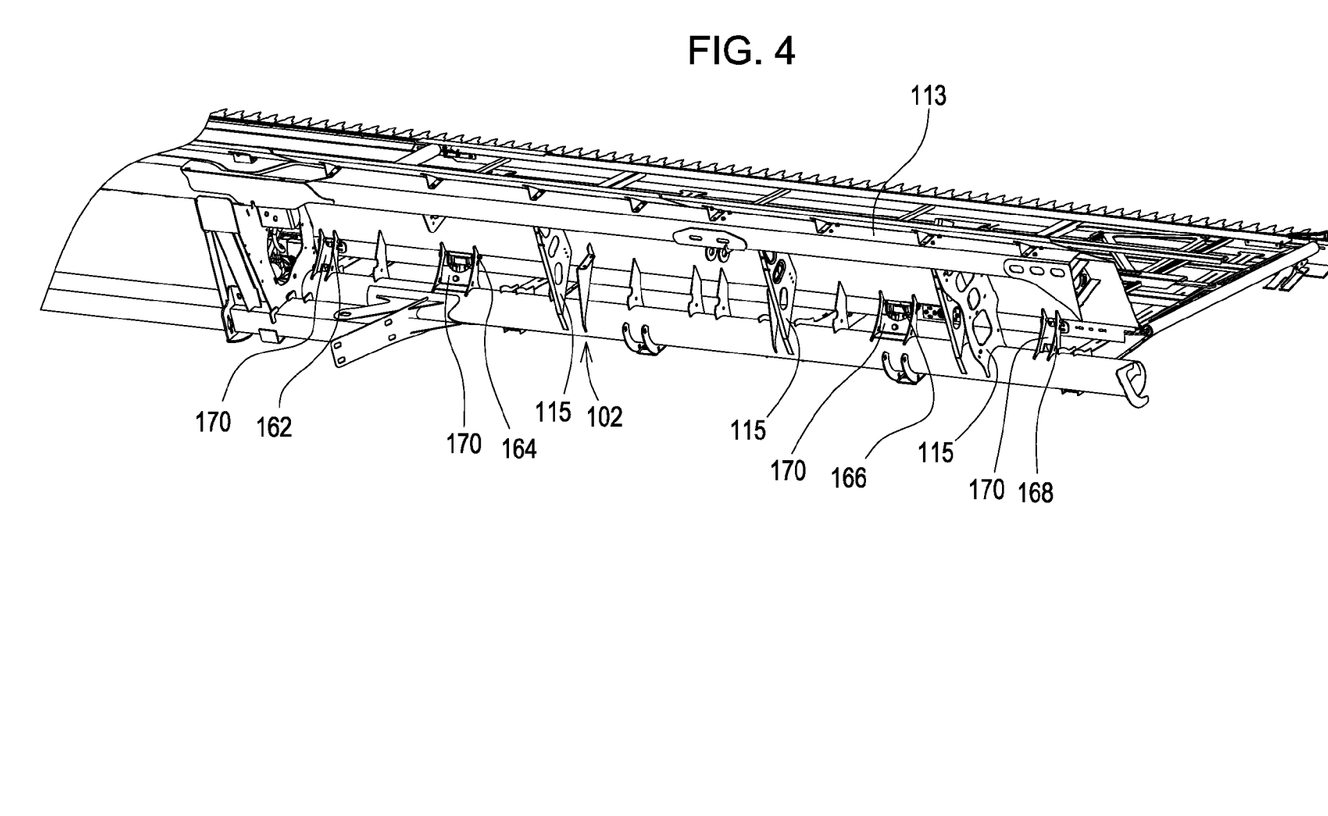
FIG. 4 is a fragmentary rear right side perspective view of the right side of the draper header of the foregoing figures.

Referring to FIG. 4, four hinges 162, 164, 166, 168 are fixed to brackets 170 that form a portion of main frame member 112. Hinges 162, 164, 166, 168 are provided to pivotally couple rear frame member 128 (and hence side draper conveyor frame 120 and right side draper conveyor 106) to the brackets 170 and hence to main frame member 112 of the main draper frame 102. Hinges 162, 164, 166, 168 constrain side draper conveyor frame 120 to pivot with respect to main frame member 112 about a generally horizontal and longitudinally extending axis passing through and defined by all four hinges that is parallel to main frame member 112 and to rear frame member 128.

Figure 5:
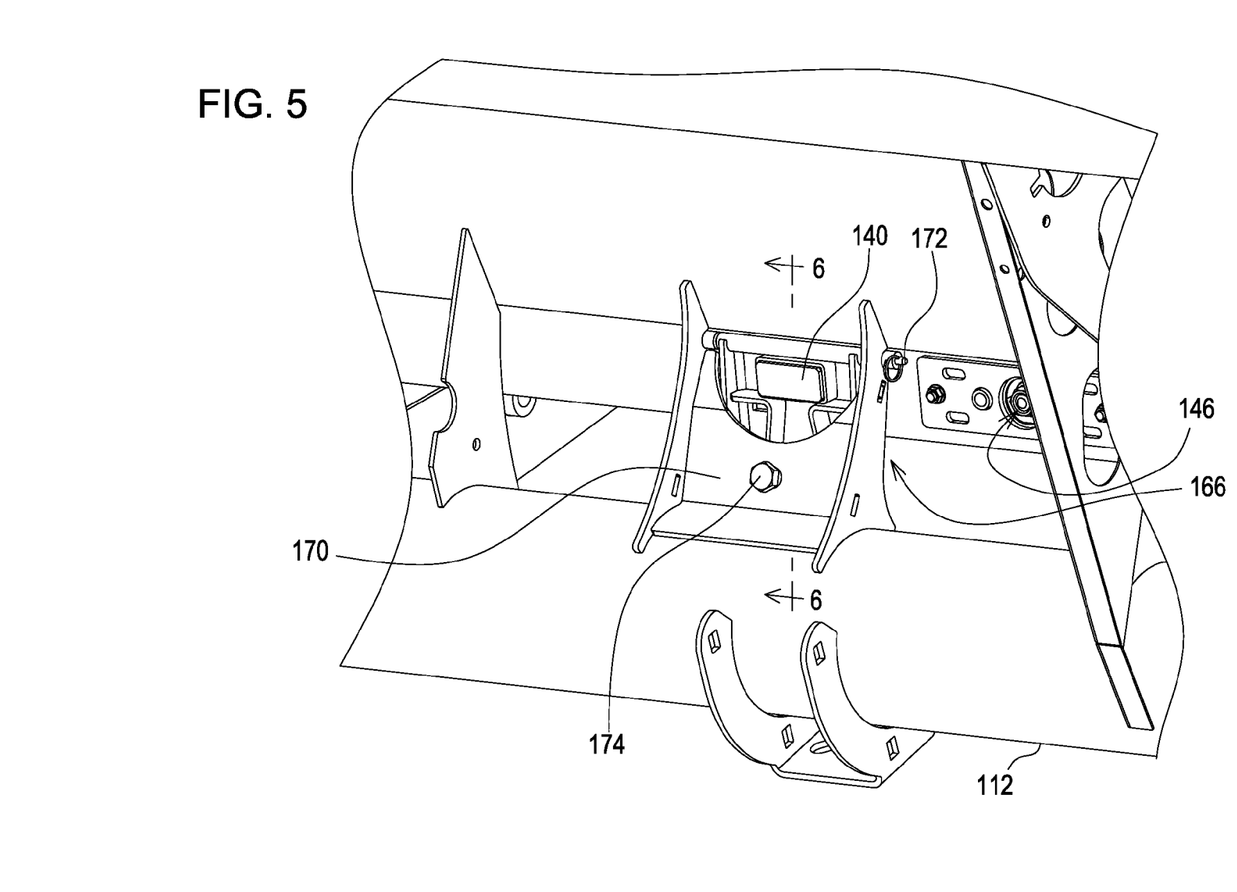
FIG. 5 is a detail view of the view of FIG. 4.
Figure 6:
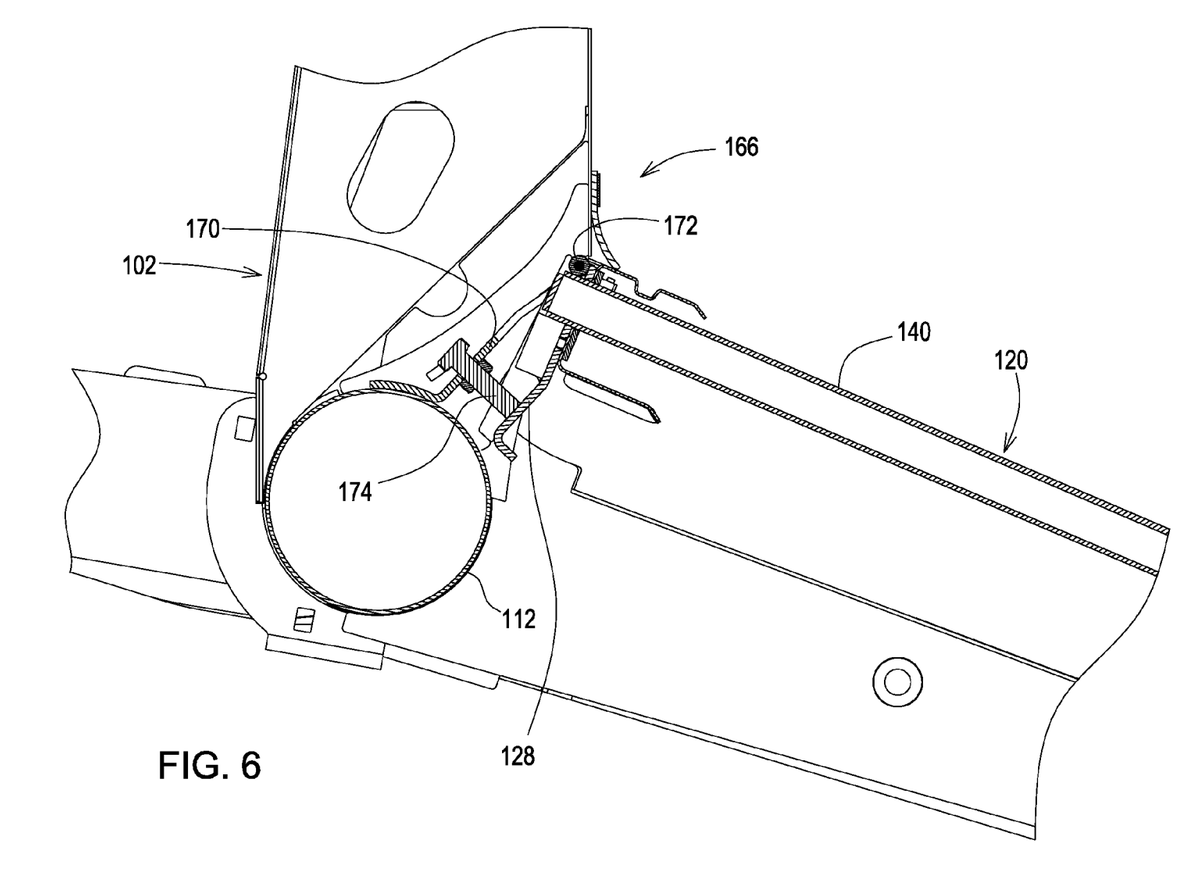
FIG. 6 is a cross-sectional view through the draper header of FIG. 5 taken at section line 6-6 in FIG. 5.

In FIGS. 5 and 6, hinge 166 can be seen in greater detail. Hinge 164 is identically constructed but spaced apart from hinge 166 near the opposite (inner) end of rear frame member 128. The description below therefore applies to both hinge 164 and hinge 166, although only hinge 166 is illustrated. The hinge 166 includes a hinge pin 172 about which the side draper conveyor frame 120 pivots with respect to main frame member 112. Alternatively, three (or fewer) of the hinges can be removed thereby supporting the side draper conveyor frame on at least one hinge (or more).

Height adjuster 174 has an adjustable working length and is engaged to both bracket 170 and rear frame member 128. The working length of the height adjuster 174 refers to the distance between the height adjuster's connection to the main frame (in this case a threaded through-hole) and the height adjuster's connection (in this case its abutment) to the side draper conveyor frame 120.

Height adjuster 174 is shown herein as a threaded member, e.g. a jackscrew, and end changes its working length as it is rotated. As it is rotated, it therefore changes the distance between side draper conveyor frame 120 and bracket 170 of main frame member 112 and therefore changes the angle therebetween.

In the embodiment shown here, as height adjuster 174 is screwed into bracket 170, its other end (the working end of height adjuster 174) is moved farther away from bracket 170. The working end of height adjuster 174 abuts rear frame member 128 below hinge pin 172. As the height adjuster 174 increases its working length, it causes rear frame member 128 to pivot upward with respect to side draper conveyor frame 120, pivoting about the longitudinal axis defined by hinges 162, 164, 166, 168, and thereby changing their relative angular positions.

In an alternative arrangement, the height adjuster 174 and the hinge pin 172 could have exchanged their positions such that height adjuster 174 is above the hinge pin 172. In these relative positions, decreasing the working length of height adjuster 174 would serve to lift the forward edge of side draper conveyor frame 120 by decreasing the distance between the upper portion of rear frame member 128 and bracket 170.

Two hinges, hinge 164 and hinge 166, are identically constructed, each having an associated height adjuster 174. In order to minimize the amount of weight exerted on each height adjuster 174, it is beneficial to provide more than one height adjuster 174, although either one of the height adjusters 174 would work by itself. Referring to FIG. 4, the two height adjusters 174 are spaced roughly 20% in from the opposing ends of side draper conveyor frame 120. If a single height adjuster were desired, that height adjuster may also be disposed at the midpoint between opposite ends of the side draper conveyor frame 120.

Hinges 162 and 168 are constructed identically to hinges 164 and 166, but with a narrower bracket 170 and no height adjusters 174. In an alternative embodiment, each of hinges 162 and 168 could be constructed identically to the hinges 164 and 166 and either one or both could be provided with height adjusters 174. In these arrangements there would be three or four height adjusters 174, total. The only practical limit on the number of height adjusters 174 provided for each side conveyor is the amount of time it would take to adjust them during the lifting process. The more height adjusters 174 that are provided, the less the load on each height adjuster 174 and therefore the easier to adjust any individual height adjuster 174, which is a benefit. However, the more height adjusters 174 that are provided, the longer the time it takes to adjust them, therefore increasing the amount of time it takes to lift the side draper conveyor frame 120, which is a disadvantage.

Figure 7:
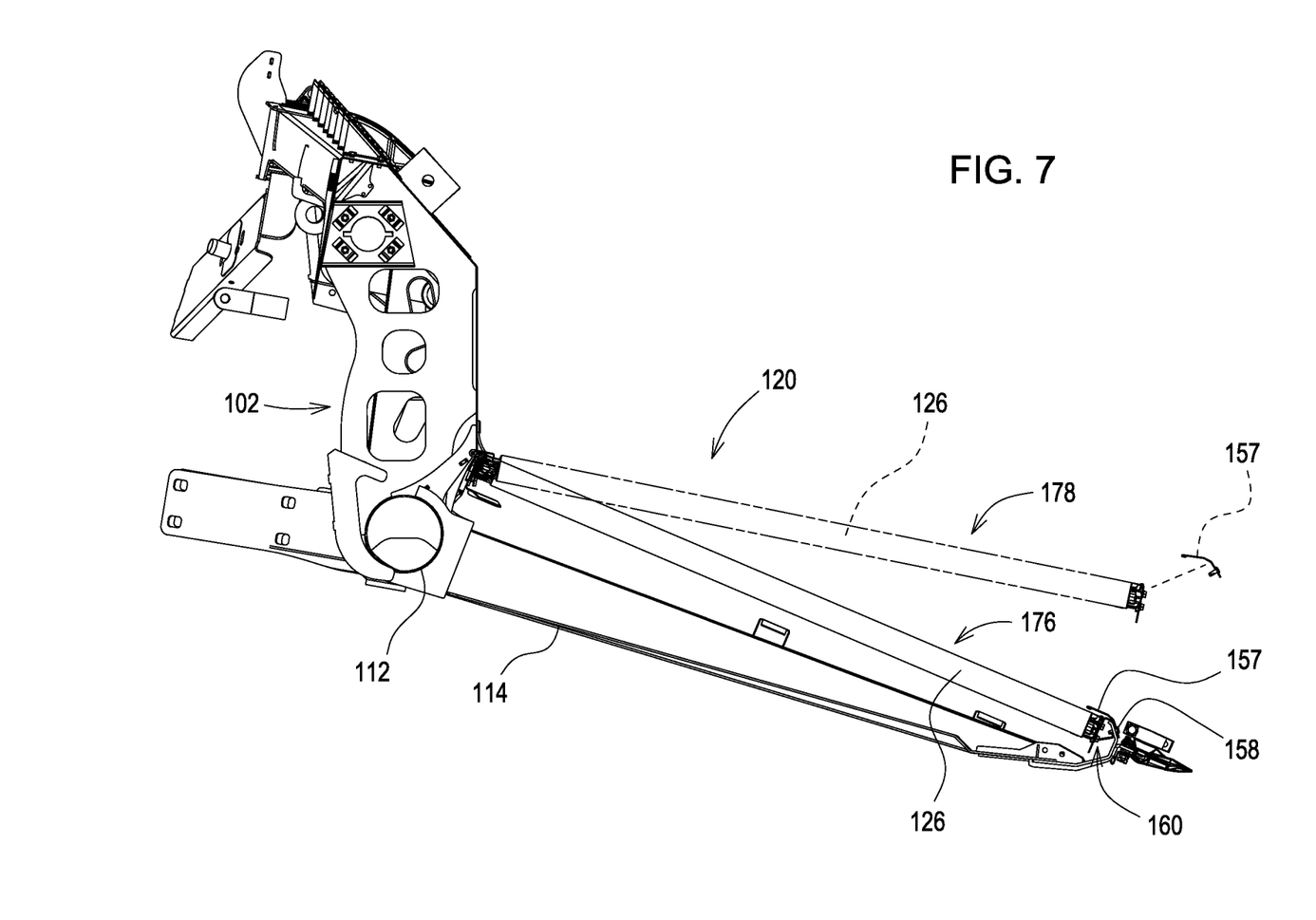
FIG. 7 is a fragmentary right side view of the draper header of the foregoing figures showing the right side draper conveyor in a lowered operating position and in a raised belt-changing position.

In FIG. 7, the relative positions of side draper conveyor frame 120 can be seen when the height adjuster 174 is in two different positions. In the first position, position 176, height adjuster 174 has been retracted, it's working length decreased, and the forward edge of side draper conveyor frame 120 lowered to its operating position. In the second position, position 178, height adjuster 174 has been extended, its working length increased, and the forward edge of side draper conveyor frame 120 is lifted into its belt-changing position.

In typical practice, the operator first removes all a threaded fasteners 158 that hold the forward edge of the brackets 157 to the reciprocating knife 110. The operator then moves to the rear of the draper header 100 and manipulates the adjustment member 146 at the back of the draper header 100 to slacken the endless belt 118 on the first and second rollers 124, 126. Once slackened, the operator then manipulates the height adjusters 174 by increasing their working length and thereby pivoting the side draper conveyor frame 120 and the first and second rollers 124, 126 up into the air as shown in FIG. 7 in phantom lines.

Alternatively, the operator can lift the leading edge of the side conveyors manually, and someone else can change (in this embodiment increase) the working length of the height adjusters 174 to hold the side conveyors in the selected position. By lifting the leading edge of the side conveyors and pivoting them upward, the load on the height adjusters 174 is eliminated. This adds an additional step to the process, but is faster since it removes the load from the height adjusters 174, which makes it easier and faster to increase the length of each height adjuster 174.

Once raised, the operator slides endless belt 118 forward and off the side draper conveyor frame 120 without having to cut or otherwise separate the belt to form one or more elongate sheets. The operator can then slide a replacement belt onto the side draper conveyor frame 120 and follow the steps in reverse order to secure the side draper frame and new endless belt in their operating positions.

This process provides a quick and easy way to replace an endless side draper conveyor belt on a draper header. By providing height adjusters 174, the operator is free to move around to the front of the draper platform once the side draper conveyor frame is lifted into the air and to remove and replace the belt single-handedly.

The various devices described in this specification suggest several ways to practice the invention. Other ways of practicing the invention are also possible as long as they fall within the scope of the claims.

The invention claimed is:

1. A draper header, comprising:
a main draper frame extending substantially a full width of the header and having left and right sides extending transversely outwardly from a central portion of the main draper frame and each side including a transversely extending lower rear member and a plurality of transversely spaced knife supports joined to and extending forwardly from each said lower rear member;
a transversely extending reciprocating knife being supported at a forward end of said knife supports;
a left side draper conveyor located above the plurality of knife supports of the left side of the main draper frame;
a right side draper conveyor located above the plurality of knife supports of pivotally the right side of the main draper frame;
wherein the left and right side draper conveyors are respectively comprised of,
a left and right side draper conveyor frames,
at least one hinge coupling the left side draper conveyor frame to the lower rear member of the left side of the main draper frame and defining a transverse left hinge axis about which said left side draper conveyor frame may pivot between a lowered operating position and a raised belt-changing position,
at least one other hinge coupling the right side draper frame to the lower rear member of the right side of the main draper frame and defining a transverse right hinge axis about which said right side draper conveyor frame may pivot between a lowered operating position and a raised belt-changing position,
a first set of first and second rollers respectively being supported on an inner end and on an outer end of, and forming part of, the left side draper conveyor frame,
a second set of first and second rollers respectively being supported on an inner end of and on an outer end of, and forming part of, the right side draper conveyor frame,
left and right endless belts respectively extending about and supported on the first and second rollers of each of said left and right side draper conveyor frames, each endless belt having an upper surface disposed to receive crop severed from the ground by said reciprocating knife and to transport it laterally toward said central portion of the main draper frame, each endless belt further defining a forward edge disposed to move in a recirculating path adjacent to the reciprocating knife, and each endless belt further defining a rear edge disposed to move in a recirculating path adjacent to the associated one of said at least one hinge or said at least one other hinge, and
at least first and second height adjusters each having an adjustable working length and being respectively mounted relative to the left and right hinge axes to act between the main draper frame and the left and right side draper conveyor frames so as to pivot the left and right side draper conveyor frames respectively upward about said left and right hinge axes, relative to the knife supports and the reciprocating knife, between a lowered operating position and a raised belt-changing position, when the working length of the at least first and second height adjusters is changed.

2. The draper header of claim 1, wherein each of the first and second height adjusters is a threaded fastener, with each threaded fastener being disposed below the axis of rotation defined by the hinges.

3. The draper header of claim 2, wherein the the first and second threaded fasteners are respectively threaded fore-and-aft through the right and left sides of the main draper frame and have respective rear ends accessible from a rear side of the main draper frame and forward ends that abut the right and left side draper frames at respective points below the axis of rotation.

4. The draper header of claim 1, wherein the left and right side draper conveyors further comprise left and right elongate front members respectively disposed adjacent to respective a forward edges of the left and right endless belts, and elongate left and right rear members that are respectively disposed adjacent to respective rear edges of the left and right endless belts.

5. The draper header of claim 4, wherein the elongate front member and elongate rear member of each of the left and right side draper conveyors are generally parallel.

6. The draper header of claim 1, further comprising at least one bracket removably fixed to the reciprocating knife forwardly of each of said left and right draper conveyors, the at least one bracket removably fixed to the reciprocating knife forwardly of each of said left and right side draper conveyors further defining a rear edge that extends over the forward edge of an adjacent one of the left and right endless belts for retaining the left and right draper conveyors in their lowered operating positions.

7. The draper header of claim 6, wherein the at least one bracket is disposed above the left side draper conveyor and the right side draper conveyor such that the endless belts of the conveyors cannot be slidably removed from their respective conveyor frames until the at least one bracket is removed and the left and right side draper conveyors are pivoted upwardly about said axis of rotation to their belt-changing positions.

8. The draper header of claim 6, wherein the at least one bracket is a crop ramp that is disposed to carry crop from the reciprocating knife over the forward edge of the endless belt.

9. A side draper conveyor in combination with a draper header having a left side and a right side, a laterally extending main frame extending approximately a full width of the header and including a left side and a right side, and a reciprocating knife fixed to and extending forward from a forward edge of the main frame, the side draper conveyor having a length substantially equal to, and being mounted to, one of the left and right sides of the main draper frame and comprising:
   a laterally extending side draper conveyor frame extending above said one of the left and right sides of the main frame,
   at least one hinge coupling the side draper conveyor frame to the main frame for pivoting upwardly relative to said main frame and said knife about a transverse hinge axis between a lowered operating position and a raised belt-changing position,
   a first roller forming part of and being supported on an inner end of the side draper conveyor frame for rotation about a fore-and-aft axis,
   a second roller forming part of and being supported on an outer end of the side draper conveyor frame for rotation about a second fore-and-aft axis extending parallel to said first fore-and-aft axis,
   an endless belt extending about and supported on the first and second rollers, the endless belt having an upper surface disposed to receive crop severed from the ground and to transport it laterally toward a central portion of the main frame, the endless belt further defining a forward edge disposed to move in a recirculating path adjacent to the reciprocating knife, and further defining a rear edge disposed to move in a recirculating path adjacent to the at least one hinge, and
   at least one height adjuster mounted between the main frame and side draper conveyor frame and having an adjustable working length and being disposed relative to said hinge so as to pivot the side draper conveyor frame upward about the hinge axis when the working length of the at least one height adjuster is changed.

10. The side draper conveyor of claim 9, wherein the height adjuster is a threaded fastener, and further wherein the threaded fastener is disposed below the hinge axis of said at least one hinge.

11. The side draper conveyor of claim 10, wherein the threaded fastener comprises a jackscrew and abuts the side draper conveyor frame at a point below the hinge axis.

12. The side draper conveyor of claim 9, wherein the side draper conveyor frame further comprises an elongate front member disposed adjacent to a forward edge of the endless belt and an elongate rear member that is disposed adjacent to a rear edge of the belt.

13. The side draper conveyor of claim 12, wherein the elongate front member and elongate rear member are generally parallel.

14. The side draper conveyor of claim 9, further comprising at least one bracket removably fixable to the reciprocating knife, the at least one bracket further defining a rear edge that extends over the forward edge of the endless belt when said at least one bracket is removably fixed to the reciprocating knife.

15. The side draper conveyor of claim 14, wherein the at least one bracket is disposed above the draper conveyor when the draper conveyor is in its operating position, the at least one bracket then preventing the endless belt of the conveyor from being slid forwardly and removed from the side draper frame until the at least one bracket is removed from the reciprocating knife and the conveyor raised about the hinge axis to the belt-changing position.

16. The side draper conveyor of claim 14, wherein the at least one bracket is a crop ramp that is disposed to carry crop from the reciprocating knife over the forward edge of the endless belt when the said at least one bracket is removably fixed to the reciprocating knife.

\* \* \* \* \*